(12) United States Patent
Nicholson et al.

(10) Patent No.: US 11,346,523 B2
(45) Date of Patent: May 31, 2022

(54) LIGHT EMITTING SYSTEM, A DESIGN ELEMENT, A REAR VIEW DEVICE, A COVERING DEVICE, AND A BODY COMPONENT OF A VEHICLE

(71) Applicant: MOTHERSON INNOVATIONS COMPANY LIMITED, London (GB)

(72) Inventors: James Nicholson, Lonsdale (AU); Shane Randell Koehne, Lonsdale (AU); Scott Edwards, Lonsdale (AU); Simon Belcher, Lonsdale (AU); Jacob Heath Messenger, Lonsdale (AU); Mathew Chapman-Winter, Lonsdale (AU); Gary Dekievit, Lonsdale (AU); Simon David Field, Lonsdale (AU); Shahad Algurabi, Lonsdale (AU); Sam Thoday, Lonsdale (AU); Dean Caruso, Lonsdale (AU); Bill Frank, Lonsdale (AU); Sascha Björn Heib, Lonsdale (AU); Andreas Herrmann, Stuttgart (DE); Ilka Rötzer, Denkendorf (DE); Matthias Koller, Stuttgart (DE)

(73) Assignee: Motherson Innovations Company Limited, London (GB)

(*) Notice: Subject to any disclaimer, the term of this patent is extended or adjusted under 35 U.S.C. 154(b) by 164 days.

(21) Appl. No.: 16/738,513

(22) Filed: Jan. 9, 2020

(65) Prior Publication Data

US 2020/0217477 A1 Jul. 9, 2020

Related U.S. Application Data

(63) Continuation-in-part of application No. 16/722,194, filed on Dec. 20, 2019, which is a
(Continued)

(51) Int. Cl.
*F21S 43/31* (2018.01)
*B60Q 1/04* (2006.01)
(Continued)

(52) U.S. Cl.
CPC ............ *F21S 43/31* (2018.01); *B60Q 1/0408* (2013.01); *B60Q 1/2619* (2013.01);
(Continued)

(58) Field of Classification Search
CPC .. B60Q 1/0408; B60Q 1/2619; B60Q 1/2696; B60Q 1/30; B60Q 1/34; B60Q 1/50;
(Continued)

(56) References Cited

U.S. PATENT DOCUMENTS 9,176,256 B2 11/2015 Hall et al.
9,181,616 B2 11/2015 Evans et al.
(Continued)

FOREIGN PATENT DOCUMENTS

DE 3843522 A1 7/1990
DE 102015205630 A1 10/2015
(Continued)

OTHER PUBLICATIONS

Extended European Search Report dated May 19, 2021 of European application No. 21150608.4-1012.
(Continued)

*Primary Examiner* — Jason M Han
(74) *Attorney, Agent, or Firm* — Jones Day

(57) ABSTRACT

A light emitting system includes at least one light pipe, at least one light source disposed at least partially within an interior of the system, at least one mask, and a lens substantially enclosing the interior of the system, the at least one light pipe, and the at least one light source, the lens having an inner surface, an outer surface disposed opposite the inner
(Continued)

surface and at least one of a continuous transparent or translucent coating on the outer surface.

34 Claims, 9 Drawing Sheets

Related U.S. Application Data continuation-in-part of application No. 16/439,674, filed on Jun. 12, 2019, now Pat. No. 10,563,838, which is a continuation of application No. 16/378,553, filed on Apr. 8, 2019, now Pat. No. 10,443,808, which is a continuation of application No. 16/378,533, filed on Apr. 8, 2019, now Pat. No. 10,443,807.

(60) Provisional application No. 62/642,010, filed on Mar. 13, 2018.

(51) Int. Cl.
| | | |
|---|---|---|
| *B60Q 1/30* | (2006.01) | |
| *B60Q 1/26* | (2006.01) | |
| *F21S 43/20* | (2018.01) | |
| *F21S 41/36* | (2018.01) | |
| *F21S 41/20* | (2018.01) | |
| *B60Q 1/34* | (2006.01) | |

(52) U.S. Cl.
CPC ............ *B60Q 1/2696* (2013.01); *B60Q 1/30* (2013.01); *B60Q 1/34* (2013.01); *F21S 41/285* (2018.01); *F21S 41/36* (2018.01); *F21S 43/26* (2018.01); *B60Q 2400/20* (2013.01); *B60Q 2400/30* (2013.01)

(58) Field of Classification Search
CPC .. B60Q 3/54; B60Q 2400/20; B60Q 2400/30; B60Q 2400/40; B60Q 2400/50; F21S 41/285; F21S 41/36; F21S 43/239; F21S 43/245; F21S 43/26; F21S 43/31; F21S 43/50
See application file for complete search history.

(56) References Cited

U.S. PATENT DOCUMENTS

| | | |
|---|---|---|
| 9,656,601 B2 | 5/2017 | Evans et al. |
| 9,819,343 B2 | 11/2017 | Koehne et al. |
| 2009/0190369 A1 | 7/2009 | Elwell |
| 2009/0257241 A1 | 10/2009 | Meinke et al. |
| 2013/0130674 A1 | 5/2013 | De Wind et al. |
| 2015/0323149 A1 | 11/2015 | Salter et al. |
| 2017/0267179 A1 | 9/2017 | Herrmann et al. |
| 2018/0229648 A1 | 8/2018 | Meier et al. |
| 2019/0176692 A1 | 6/2019 | Betz et al. |
| 2019/0323676 A1 | 10/2019 | Heib et al. |
| 2019/0324362 A1 | 10/2019 | Favero et al. |

FOREIGN PATENT DOCUMENTS

| | | |
|---|---|---|
| EP | 0756131 A1 | 1/1997 |
| EP | 0969245 A2 | 1/2000 |
| EP | 3228501 A1 | 10/2017 |
| WO | WO 2017/092844 A1 | 6/2017 |

OTHER PUBLICATIONS

Extended European Search Report dated Oct. 22, 2020 of European application No. 20167751.5-1012.

LIGHT EMITTING SYSTEM, A DESIGN ELEMENT, A REAR VIEW DEVICE, A COVERING DEVICE, AND A BODY COMPONENT OF A VEHICLE

CROSS-REFERENCE TO RELATED APPLICATION

This application is a continuation-in-part of U.S. patent application Ser. No. 16/722,194, filed Dec. 20, 2019, which is a continuation-in-part of U.S. patent application Ser. No. 16/439,674, filed Jun. 12, 2019, which is a continuation of U.S. patent application Ser. No. 16/378,553, filed Apr. 8, 2019, which is a continuation of U.S. patent application Ser. No. 16/378,533, filed Apr. 8, 2019, which claims the benefit of priority to U.S. Provisional Patent Application No. 62/642,010, filed Mar. 13, 2018; and this application claims the benefit of foreign priority to German Patent Application No. DE 10 2019 100 520.5, filed Jan. 10, 2019, each of which is hereby incorporated by reference in its entirety for all purposes.

In addition, U.S. patent application Ser. No. 16/180,857, filed Nov. 5, 2018, U.S. patent application Ser. No. 15/922,366, filed Mar. 15, 2018, U.S. patent application Ser. No. 15/800,413, filed Nov. 1, 2017, U.S. patent application Ser. No. 15/607,894, filed May 30, 2017, U.S. patent application Ser. No. 15/603,751, filed May 24, 2017, U.S. patent application Ser. No. 15/439,188, filed Feb. 22, 2017, U.S. patent application Ser. No. 15/000,754, filed Jan. 19, 2016, U.S. patent application Ser. No. 14/936,024, filed Nov. 9, 2015, U.S. patent application Ser. No. 14/374,376, filed Jul. 24, 2014, and U.S. patent application Ser. No. 14/022,896, filed Sep. 10, 2013, are each incorporated herein by reference in their entirety for all purposes.

BACKGROUND

1. Field of the Invention

The present disclosure relates to a light emitting system that may be used for vehicular light components. For example, a vehicle design element is selected from, for example, vehicle emblems, badges, logos and the like and/or other vehicular light components, such as in rear view mirrors. The system can provide a uniform light output without the use of light guide optic features and without the light source being viewable. Mask methods for such systems, use of the system in a cover for the exterior and/or interior of an automobile, a body component of an automobile including such a system, and an automobile including such a system or a cover and/or body component of an automobile are also described.

2. Related Art

Vehicles, such as passenger cars, vans and trucks, include various interior and exterior vehicular lighting components capable of emitting light for various purposes. To increase safety on the road, motor vehicles are known to have different lighting means, such as to illuminate the road area located in front of the vehicle, or to ensure the visibility of the motor vehicle by other road users by means of corresponding taillights. However, it has been found that the illumination means known from the prior art basically provide good security, but are not optimally suitable especially for the lateral illumination of the motor vehicle since, for example, there is often insufficient installation space for arranging conventional illumination means. In addition, previously known light sources are often less flexible in terms of individual design specifications and thus expensive to use when used in a variety of different models of motor vehicles.

Aesthetic features, which have become desirable in automotive applications, are to provide exterior and/or interior badges and/or emblems or the like on vehicles or specific parts of a vehicle. Such aesthetic features are backlighting of key features of the particular badge or emblem or are illuminated for optical or safety aspects. For example, parts or all of door finishers may be illuminated in such a way. It is desirable that these elements are backlit with an even (uniform or homogenous) luminance using, for example, light emitting diodes (LEDs) input. An LED is a directional light source having a relative luminous intensity that decreases as the viewing angle is increased. This may result in the appearance of bright or hot spots to an external viewer of the badge.

Lighting systems that provide a uniform luminous intensity are known such as systems using expensive organic light emitting diode (OLED) technology or complex lens and reflector arrangements. Highly diffusing materials are also used but these have the drawback of giving a milky or hazy appearance and have poor optical efficiency. Optic features may also be used on clear materials to diffuse light, but these have the drawback that the optic features are visible in the unlit state which is undesirable. A further desirable feature is that the LED input is not directly visible to the external viewer of the badge or emblem.

Typically, it is convenient and desired to hide any lighting means, i.e. so that the lighting means cannot be seen from the outside but only once the lighting means has been lit. Such a system is known as Hidden Till Lit (HTL) system. Metallic reflective coatings which provide such features are known from, for example, WO 2011/075796 and WO 2013/110122. Several problems arise from such HTL system known from the art, such as light bleed alongside walls of the lens, light piping and/or double imaging. In addition, these system may be less flexible. Also, known HTL systems require a plurality of separate elements causing complexity of design and assembly and increasing costs.

SUMMARY

In one aspect, a light emitting system includes at least one light pipe; at least one light source, disposed at least partially within an interior of the system, wherein the at least one light source is configured to emit light based on at least receiving electrical power from an electrical power source, wherein the at least one light source being arranged adjacent to and directed towards the at least one light pipe at least one mask; and a lens substantially enclosing the interior, the at least one light pipe and the at least one light source, the lens having an inner surface, an outer surface disposed opposite the inner surface and a continuous transparent and/or translucent coating on the outer surface, wherein with the at least one light source receiving electrical power from the electrical power source, the continuous transparent and/or translucent coating is at least partially permeable to at least some light which is emitted by the at least one light source and passed through the lens.

The interior of the system, for example the light source, light guide etc., may be switchable between an on state and an off state, hidden until illumination is turned on so that the light produced in the inside the system can be seen from outside ("Hidden Till Lit" (HTL)). Thus, for example, any logo or emblem which was hidden may be visible only then.

This HTL feature of the system may be provided by a transparent and/or translucent coating applied to the lens, either on the outside or the inside. Preferably, the coating may be provided on the outside of the lens. Such transparent and/or translucent coating may be a coating that has a certain reflectivity so that, for example, the light source or light pipe cannot be seen from one side but that has also a certain degree of translucence so that the light from the light source and/or the light pipe can be seen once lit.

The at least one light source may be any light source that can be used to provide the required amount of light, either light of one color or lights of different color. At least one light source may be used, and two or more light sources may also be used. For example, if two or more light sources are used, each light source may provide light in a different color or in a different brightness.

The light source may be any suitable light source applicable for the intended purpose. In one embodiment, at least one LED lamp is used to illuminate at least one light pipe. Here, the at least one LED lamp could be arranged at one end of the light pipe, to radiate light into the light pipe. The light is then radiated away from the light pipe along the length of the light pipe. Preferably, two or more LED lamps are used, where for example at each end of the light pipe one LED lamp is located. The light source may provide light in different or changing colors.

The light source may include one or more LED's, one or more OLED's, a similar display technology, a surface lit plastic sheet, such as Acrylite® (Evonik Industries), or any combination thereof. The at least one light source may be attached to a printed circuit board (PCB). The printed circuit board can include additional light sources, optionally positioned adjacent to light receiving surfaces to direct light into the light pipe. Generally, the light source may be hidden and cannot be seen from the outside. The at least one light source may be electrically-connected to the vehicle and is configured to emit light based on at least receiving electrical power from the vehicle, such as from an electrical power source (e.g. vehicle electrical system, battery, etc.) on the vehicle. As non-limiting examples, the at least one light source may be electrically-connected to the vehicle by way of one or more wiring harnesses or other suitable electrical connectors as may be understood by the skilled person.

The at least one light source may be arranged adjacent to and directed towards the light pipe. Other locations and directions of the light source are possible and within the skilled persons knowledge. The at least one light source, while unlit and emitting no light, may be advantageously concealed behind the transparent and/or translucent coating of the lens.

The light source may be a logo lamp or projector which functions as the mask.

The at least one light pipe may be a light pipe generally used in automotive applications. The light pipe may be substantially transparent and without any visible discrete optic features in an un-lit state, while being diffusive in a lit state. But the light pipe annulus can also be substantially transparent and non-diffusive in both a lit and un-lit state, while the circumferential flanges or cylinders are substantially transparent in an un-lit state, while being diffusive in a lit state.

The light pipe may include a clear polymeric material. The clear polymeric material may be selected from the group consisting of polyacrylate, such as poly(methyl methacrylate) (PMMA), polyester, polystyrene, polyethylene, polypropylene, polyamides, polycarbonate, epoxy, phenolic, acrylonitrile-butadiene-styrene, acrylonitrile-styrene-acrylates, acetal and blends of these. Preferred substrate materials include polycarbonate, poly(2,2'-dihydroxyphenylpropane) carbonate, polydiethyleneglycol bis(allylcarbonate), polymethylmethacrylate and polystyrene, or blends thereof. In one embodiment the light pipe is made from PMMA. Here, the term "light pipe" can be used to refer to a tubular structure that is adapted to transport light. Light might be coupled into the light pipe at one, or at both ends of the light pipe. The light is then being radiated from the light pipe along its length, or at least along part of its length.

At least one light pipe may be used in the system, and one, two, three, four, or more light pipes may also be used. In one embodiment, two light pipes are used.

In one embodiment, the at least one light pipe may be adapted to sequentially radiate the light from the at least one LED lamp. In the description, the term "sequentially" can be used to refer to a light sweep effect. For example, light might sweep from the center of the vehicle outwards to promote direction of travel, where the light has the appearance of a continuous even illumination. Therefore, the light pipe could include reflecting and/or diffusing elements for creating the light sweep effect.

In one embodiment, the housing behind the light guide may be shaped to promote reflection of light back into the adjacent environment.

In embodiments, the front surface of the lens is a polished, textured or machined surface. When the transparent and/or translucent coating is deposited on a polished, textured or machined substrate surface it provides a visible surface that is either a highly polished metal looking surface or a textured metal surface that replicates metal finishing, for example brushed stainless steel.

The lens may be made out of clear and/or translucent polymeric material. The polymeric material may be formed from a material selected from the group of polyacrylate, polyester, polystyrene, polyethylene, polypropylene, polyamides, polyamides, polycarbonate, epoxy, phenolic, acrylonitrile-butadiene-styrene, acrylonitrile-styrene-acrylates, acetal and blends of these, but is not limited thereto. For example, the lens may be formed from a material selected from the group of polycarbonate, poly(2,2'-dihydroxyphenylpropane) carbonate, polydiethyleneglycol bis(allyl carbonate), polymethylmethacrylate and polystyrene, or blends thereof.

The lens may have an outer component, preferably made from a clear material mentioned above, and an inner component, preferably over molded on the inner surface of the outer component and/or made from opaque material. The lens inner component material optic properties can be selected to additionally increase or decrease the reflected light back into the light pipe. A highly reflective material will increase the final light output level, a non-reflective material will reduce the overall final light output level.

The lens may be formed by any process known in the art, such as, for example, injection molding and/or thermoforming, but is not limited thereto.

The lens may include a pre-coated film in the form of either a hardcoat, a silicon hardcoat, an inorganic oxide, or a thin metal film, or a combination of such pre-coated films.

The transparent and/or translucent coating may be a coating that has a certain reflectivity so that, for example, the light source or light pipe cannot be seen from one side but that has also a certain degree of translucence so that the light from the light source and/or the light pipe can be seen once lit. The transparent and/or translucent coating may be any coating that provides the desired functionality. For example, the transparent and/or translucent coating may be a transparent and/or translucent metal layer formed from a metal, alloy or conductive metalloid selected from the group consisting of chromium, aluminum, titanium, nickel, molybdenum, zirconium, tungsten, niobium, tantalum, cobalt, manganese, silver, zinc, silicon, and mixtures thereof; an oxide, nitride, boride and/or carbide thereof and mixtures thereof, and/or alloys of any of the aforementioned metals, steel, stainless steel, or silicon. In one embodiment, the transparent and/or translucent coating is a chromium-based reflective coating, and both the polymeric substrate and the chromium-based reflective coating are at least in part permeable to light originating from the at least one light pipe.

For example, the transparent and/or translucent coating may be an alloy of chromium and a dopant material, the dopant material being selected from the hexagonally close-packed transition metals, the alloy having a crystal structure of a primary body-centered cubic phase in coexistence with a secondary omega hexagonally close-packed phase. The alloy may be a binary alloy of chromium and the dopant material.

The atomic percentage of the dopant material in the binary alloy may range from about 1.9 at. % to about 5.8 at. %. The dopant material may be selected from hexagonally close-packed transition metals zirconium, titanium, cobalt, hafnium, rubidium, yttrium and osmium. In one embodiment the dopant material may be selected from hexagonally close-packed transition metals zirconium, titanium and cobalt. For example, the alloy may be a binary alloy and the dopant material is zirconium where the atomic percentage of the zirconium in the binary alloy is in the range of from about 4.5 at. % to about 5.8 at. %. In a further embodiment, the alloy may be a binary alloy and the dopant material may be titanium, and where the atomic percentage of the titanium in the binary alloy is in the range of from about 1.9 at. % to about 5.8 at. %. In a still further embodiment, the alloy may be a binary alloy and the dopant material may be cobalt, where the atomic percentage of the cobalt in the binary alloy may be in the range of from about 1.9 at. % to 5.7 at. %.

The coating may have a thickness of 200 nm, 100 nm, be in the range of from 40 nm to 80 nm, be in the range of from 50 nm to 70 nm, or be about 60 nm, but is not limited to.

The coating may have a minimum light transmission of 5% to a maximum of 100%. In some embodiments, the light transmission of the coating is from 5% to 20%. The light transmission of the transparent and/or translucent coating may be 5%, 6%, 7%, 8%, 9%, 10%, 11%, 12%, 13%, 14%, 15%, 16%, 17%, 18%, 19% or 20%. In specific embodiments, the light transmission of the transparent and/or translucent coating is about 8%. The transmission may depend on the coating used and thus can be adjusted.

The transparent and/or translucent coating may be part of a multilayer transparent and/or translucent stack on the front surface of the lens. The multilayer stack may include other layers such as hardcoat layers, and the like. For example, a hardcoat can be applied to the lens either on top of the transparent and/or translucent coating or between the lens and the transparent and/or translucent coating. The hardcoat may be formed from one or more abrasion resistant layers. As is known in the art, a primer layer may be used between the hardcoat and the lens or the transparent and/or translucent coating to enhance adhesion of the hardcoat. The hardcoat can be formed from one or more of a range of materials known for this purpose in the art, including an organo-silicon, an acrylic, a urethane, a melamine or an amorphous organosilicon ($SiO_xC_yH_z$).

Organosilicon hard coats are particularly suitable and suitable materials include Silicone Hard Coat SHC 5020 from Momentive and GE587B from MomentiveGE Bayer. The hardcoat material may be applied in a solvent, such as an alcohol solvent. The hardcoat can be applied using any of the coating techniques known in the art, including flow coating, dip coating, spray coating, spin coating, etc. and then cured using techniques known in the art, such as heating to a temperature of about 100° C. to about 200° C. for the appropriate required period of time. Intermediate layers may be deposited between the respective layers of the multilayer stack. The intermediate layers may assist in adhesion between the respective layers and minimize or prevent delamination. The intermediate layers will generally be translucent and may be formed from silica.

The transparent and/or translucent coating can be deposited using any suitable elemental deposition technique, including Physical Vapor Deposition (PVD), Chemical Vapor Deposition (CVD), or the like.

For example, the lens may be positioned in one or more sputter deposition chambers with either planar or rotary magnetron targets, and with deposition of the transparent and/or translucent coating being achieved via DC sputtering from an elemental target. Other processes for applying or depositing coating layers can also be used. The thickness of the layer will determine the transparency and/or translucency of the layer. In one embodiment, a thickness of 2 nm to 50 nm provides a conductive transparent and/or translucent layer that allows sufficient light to pass through. A thickness of about 30 nm is particularly suitable.

In one embodiment, the mask and the lens are not interchangeable. In such an embodiment the mask and the lens form a lens-mask system in which the mask and the lens are permanently fixed together.

For example, the lens-mask system may be an in-mold decorative mask. The mask may include a resin sheet, a binder layer and an ink layer between the resin sheet and the binder layer. The ink layer and binder layer may form the stencil (pattern) which is then adhered to the resin sheet. The so-formed mask may be formed into a desired shape and subsequently molded with a clear resin that makes the lens in order to form the lens-mask system. Any molding technique may be used, for example injection-molding, but is not limited thereto. The described process may be done on either the inside or outside of the lens. In case the process is done on the outside of the lens, it has to be ensured that there will be no interference with the transparent and/or translucent coating which is applied to the lens. The mask may also extend to form an opaque layer around the edges of the leans to create an opaque housing that may eliminate light leakage.

In another embodiment, the lens-mask system may also be formed as one piece by 2K molding, wherein some parts of the lens-mask system may be translucent and other parts of the lens-mask system may not be translucent. The clear parts of the lens-mask system form the mask part. The clear parts may be additionally colored, for example by adding color pigments to further adapt the pattern provided by this system. With this setup light bleeding or double imaging problems are further limited or eliminated, As the mask is fixed, any problems that may arise with an unsecured mask are eliminated.

In one embodiment, a paint and/or opaque material may be coated onto the lens to form the mask layer. The desired pattern may then be obtained by removing or etching parts of the additional coating. This may be done on either the outer side or the inner side of the lens. In one embodiment, the negative of the image may also be achieved by using a clear material and printing or lasering the negative image thereon. Removing or etching the additional coating may be done with any suitable method known to the skilled person. In one embodiment, the removal is achieved by use of a laser.

In another embodiment, at least one gasket is part of the system. The at least one gasket may be positioned between the at least one mask and the at least one light pipe. For example, the at least one gasket may be permanently fixed to the at least one mask. The at least one gasket may provide a window for the light to go through while preventing light bleed of the edges of that window. The at least one gasket may also be interchangeable so that windows of different size and form can be provided for the desired purpose, i.e. the desired light pattern.

The system may include at least one mask which provides and is responsible for the desired pattern of illumination of the system. Generally, the mask is a kind of a stencil that has translucent and non-translucent zones, so that only a specific pattern is illuminated once light from the light source and/or the light pipe is applied to the mask. The pattern may be printed or lasered onto the mask, wherein any printing technique may be used to prepare the desired pattern on the mask. The pattern or image is a dedicated part that the stencil is place on. For example, the mask includes an at least partially translucent image thereon.

The mask may be interchangeable or may be non-interchangeable. In the former case, the mask remains a separate element of the system and may be easily replaced to produce a different illuminated pattern. This has the advantage that the mask may be customized with low cost and minimum time. In the latter case the mask is permanently fixed to, for example, the lens so that it cannot be replaced.

In case the mask is interchangeable, the mask preferably stretches along the entire size of the lens. This avoids any light bleed or light piping and also may avoid slippage of the mask within the inventive system, at least to a certain degree.

In one embodiment, the mask may be formed by molding an opaque material partly onto a clear material. The opaque material may serve as a gasket that is permanently fixed to the mask. Any suitable molding method may be used, such as a 2K molding of an opaque and clear material. A window of clear material will be formed in at least one region of the mask. The light from the light source and/or light pipe may pass only through this window of clear material, so that the image or pattern may be printed only onto this part of the mask. The opaque housing may additionally reduce any light bleed or light piping, in particular from the side wall of the lens.

The mask may also include faded marks. Faded marks may create homogenized light levels or intentionally create brighter or duller areas so that a selective brightness can be obtained. Thus, illumination levels may be controlled by both the light source and the mask.

Faded marks may be an etch, tint, additive or a combination thereof or any other suitable material that may diffuse or absorb light in brighter areas. Faded marks may be within the clear part of the stencil in order to emphasize a part of the mask, i.e. to have different light levels within the same image.

The additional coating may also include one or more laser additives. Such laser additives may react with the laser or an UV source to produce colored parts with the lens-mask system.

In one further embodiment, a transmissive coating may be located between the lens-mask system and the transparent and/or translucent coating. This transmissive coating may smooth the outer surface of the lens in case of using the above-mentioned additional coating to create the mask pattern. This improves applying the transparent and/or translucent coating on the outer side of the lens. The transmissive coating may also be applied to the inner side of the lens.

In another embodiment, the light pipe may be formed from a material having a high refractive index and the light pipe includes a coating with a material having a low refractive index, i.e. the refractive index is lower than that of the light pipe. The coating with the low refractive index provides a larger angle of refraction so that light is pushed back into the light pipe by total internal reflection. This causes the light to remain inside the light pipe rather than be scattered or absorbed by the surrounding material causing it to illuminate the light pipe for a longer distance. The low refractive index coating may include the same gaps and/or marks as given by the mask or the lens-mask system, i.e. the low refractive index coating and the mask or lens-mask may follow the same etch or print. In one embodiment the low refractive index coating may be a uniform coating and the mask is applied on top of this coating.

The mask of the system may also be formed by one or more of the light sources mentioned above, such as one or more LED's or one or more OLED's, but is not limited to. The light sources may provide an illuminated pattern that can be changeable and/or programmable. This may allow for colors and animations to be shown that may be, for example, a reflection of the state of the vehicle or similar. With this design no additional mask layer would be necessary.

In another embodiment, the mask may be formed by a light source, wherein the light source is a logo lamp or a projector or the like. The logo lamp or projector may be positioned behind the lens and the transparent and/or translucent coating. This design avoids the need of a large freeform mask to match the styling or design of the system.

According to various aspects and in examples, improved lighting of a motor vehicle and its surroundings is possible, while cost-effective production and the greatest possible freedom of design is possible.

For example, the system may be used as a covering device for specific parts of an automobile including: at least one molded element produced and/or producible by injection molding with an inner side facing the motor vehicle and an outer side pointing away from the motor vehicle; at least one light pipe as defined above; one or more light sources as defined above, wherein the light source is arranged on the inside of the molded element or at least connected to the inside and the molded element covers the light source; at least one lens as defined above.

In one embodiment, at least a portion of the light emitted by the light source can pass through the molded element and the lens outwardly in at least a first region of the covering device, wherein the molded element is translucent at least in the first region and the lens is translucent at least in the first region or has a passage opening.

The passage opening in this case denotes a recess of any shape and size, which is suitable for allowing light from the light source/light pipe to pass through the lens. The passage opening may for example be designed as a hole in the lens. The recess may also designate a region in which the lens does not cover the molded element. The term translucency denotes the at least partial transparency of the element and/or the lens. In this case, both elements can be completely or partially transparent, wherein the complete or partial transparency can also be present only in certain areas of the molded element and/or the lens, while the other area can be made non-transparent, for example. The translucency may also designate a wavelength-dependent complete or partial transparency such that light of a wavelength or a limited wavelength range, for example the red green, yellow and/or blue wavelength range, may at least partially pass through the form element and/or the lens.

Depending on the application, in addition to the definition above, the light source/light pipe can be embodied as a point light source, as a surface radiator or as a planar or linear arrangement of a plurality of light sources. In the case of a multiplicity of light sources/light pipes, the light of the light sources/light pipes can overlap or pass through the lens in parallel to one another for illuminating a larger area, for example of the lens.

As the light source/light pipe is arranged on the inside of the molded element or at least connected to the inside and the molded element covers the light source/light pipe, it is robustly protected from external influences.

It is also provided that the translucency of the covering device and/or the lens in the first region can be adjusted by injection molding and/or different translucencies can be introduced by injection molding.

The covering device can be provided as a single covering device or composed of several separate covering devices for forming a common multi-part covering device for attachment to several separate areas of the motor vehicle, wherein in the case of multi-part covering the individual separate covering devices are provided for attachment to mutually movable areas of the motor vehicle so that the mobility of these areas is not hindered by the covering devices.

The covering device may include one display means, for example at least one emblem. It is also preferred that such display means is arranged at least partially in a first region, that the display means is at least partially translucent, in particular transparent, is configured and arranged at least in the first region. Here, the cover at least partially cover the display element.

In one embodiment, the light source/light pipe includes at least one display device, preferably at least one monitor, in particular LCD monitor, for displaying at least one display, preferably a logo and/or an emblem. It can also be provided that the light source/light pipe has at least one projection device for projecting at least one information, preferably a logo, on at least one surface and/or a light source, in particular a floor lamp and/or a puddle lamp, for illuminating at least one surface, in particular at least one region of the soil.

Furthermore, the light source/light pipe is intended
(i) to display different colors as a multicolor illumination device
(ii) to play and/or display several images,
(iii) to display user-related advertisements, in particular conveyed by key-specific information.

Furthermore, it can be advantageous that the covering device includes a multiplicity of light pipes, wherein at least a first of the light pipes distributes light to at least one of the first areas and at least a second of the light pipes distributes light to at least one other first area. In further embodiments, additional light pipes may distribute light from at least two of the plurality of light sources to the first region or further of the light pipes distribute light from further light sources to further first regions.

According to a further aspect, a body component for a motor vehicle includes at least one covering device. With such a covering device not only the corresponding body areas can be covered, but also optionally spot welds are laminated on the body component. The same applies to adhesive dots or seals that are to be covered.

In one embodiment, the covering device is arranged as a one-piece covering device or as a multi-part covering device consisting of several separate parts of the motor vehicle, wherein in the case of a multi-part covering device, the individual parts are arranged on mutually movable regions of the motor vehicle. Movable areas of the motor vehicle are, for example, different doors or the respective doors to the adjacent A, B or S pillars of the motor vehicle or the roof of the motor vehicle. The same applies to movable lids, flaps, trunk doors or flaps to the surrounding motor vehicle areas. In multi-part covering devices, the light sources/light pipes are supplied separately from each other with power, each part of the cover can be supplied as already described for the above one-piece cover or connected to other circuits, such as the turn signal, door light, etc.

In another embodiment, the one-piece covering device covers a door area, preferably from one pillar part to the other pillar part of the same door area, or covers at least a portion of the roof of the motor vehicle above the door area as a roof trim strip or roof cover. In this case, the roof covering or the roof trim strip may extend continuously from a position in the region of an A pillar of the motor vehicle to at least one position in the region of a C pillar of the motor vehicle.

In another embodiment, the one-piece covering device is arranged as a spoiler in the roof area or in the region of a rear window or in the region of a vehicle rear. Here, the spoiler may extend from one side of the motor vehicle to the other side of the motor vehicle.

In a further embodiment, the multi-part covering device extends laterally on the motor vehicle over different door regions. This may, for example, extend from a position in the region of the A-pillar to a position in the region of the C-pillar. In one embodiment, the multi-part covering device is arranged as a door shaft strip.

The terms "in the area of the A-pillar, the C-pillar, the roof, the rear window, the rear of the vehicle" denote that the covering device of a location on the A-pillar, C-pillar, the roof, the rear window, the vehicle extends back to the other corresponding locations or that the cover at least adjacent thereto.

This specific embodiment can already be achieved in the production of the molded element by appropriate consideration in the injection molding process. In addition, as an alternative or in addition, the lens also makes it possible to adjust the transmission properties in the first region, provided that the lens completely or partially covers the first region. As a result, a change in the light emerging from the covering device can be achieved even in the case of covering devices with the same shaped element only by varying the covering element. This is therefore particularly advantageous for individual adjustments of the covering device.

By using the system, the transmission properties of the light can be advantageously set. In addition, therefore, a uniform outer appearance is feasible, so that other road users are not distracted unnecessary. Thus, light sources, behind the transparent and/or translucent coating, can be arranged. As a result, an emblem and/or logo is visible only after the activation of the system.

Alternatively or additionally, the system can illuminate a surface, for example, the area in front of the motor vehicle to increase safety for the vehicle occupants when entering the motor vehicle or increase safety for other road users.

According to various aspects and in examples, the light sources can not only be arranged within the vehicle at fixed locations, but there is the possibility to provide the light sources at any position on the outside of a motor vehicle.

BRIEF DESCRIPTION OF THE DRAWINGS

The foregoing summary, as well as the following detailed description, will be better understood when read in conjunction with the appended drawings. For the purpose of illustration, there is shown in the drawings certain embodiments of the present disclosure. It should be understood, however, that the invention is not limited to the precise arrangements and instrumentalities shown. The accompanying drawings, which are incorporated in and constitute a part of this specification, illustrate an implementation of systems and apparatuses consistent with the present invention and, together with the description, serve to explain advantages and principles consistent with the invention.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

It is to be understood that the phraseology and terminology employed herein are for the purpose of description and should not be regarded as limiting. For example, the use of a singular term, such as, "a" is not intended as limiting of the number of items. Also the use of relational terms, such as but not limited to, "top," "bottom," "left," "right," "upper," "lower," "down," "up," "side," are used in the description for clarity and are not intended to limit the scope of the invention or the appended claims. Further, it should be understood that any one of the features can be used separately or in combination with other features. Other systems, methods, features, and advantages of the invention will be or become apparent to one with skill in the art upon examination of the detailed description. It is intended that all such additional systems, methods, features, and advantages be included within this description, be within the scope of the present invention, and be protected by the accompanying claims.

Figure 1:
FIG. 1 is a schematic view of an embodiment of the system.

FIG. 1 is a schematic representation of an embodiment of a system 50. A light source 64 is located adjacent to a light pipe 63. A mask 61 in direct contact to the coated lens 60 provides for the illuminated pattern. In this embodiment, a gasket 62 is located between the mask 61 and the light pipe 63.

Figure 2:
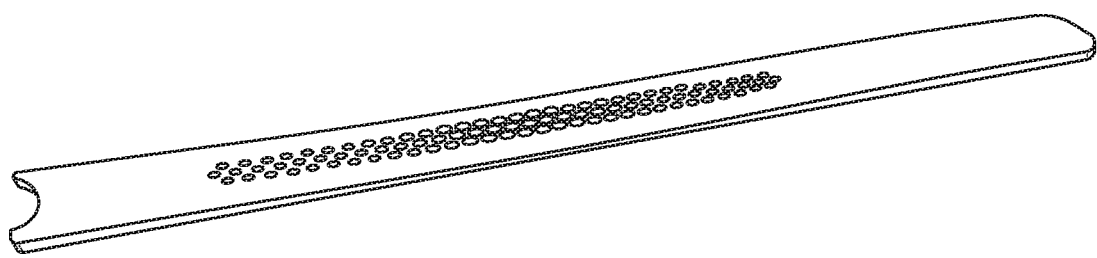
FIG. 2 is an embodiment of the mask with an image or stencil thereon.

FIG. 2 is a representation of the mask used in the system 50. The mask 61 has a specific form which is necessitated by the form of the lens (not shown; see FIG. 3). An image or stencil is printed on the mask 61 so that a specific illuminated pattern can be seen once light from the light pipe (not shown) passes the mask 61.

Figure 3:
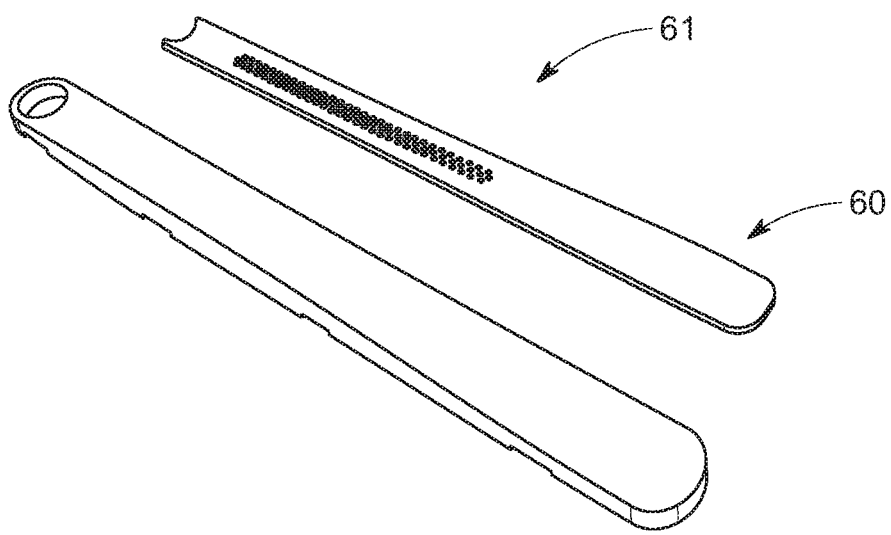
FIG. 3 is an embodiment of a coated lens with the respective mask.

FIG. 3 shows the mask 61 of FIG. 2 and the respectively coated lens 60.

Figure 4:
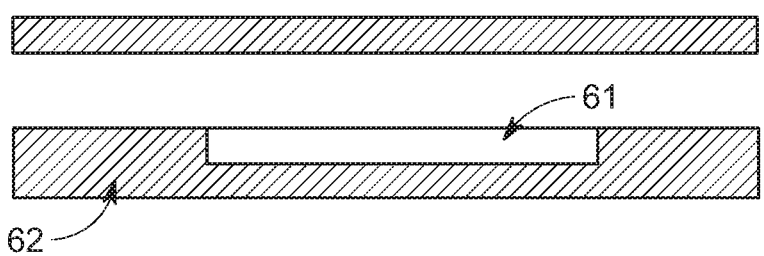
FIG. 4 is an embodiment of a 2K molded mask window.

FIG. 4 is an embodiment of a 2K molded mask window. The mask 61 is in the form of a central window, whereas an opaque material has been molded to form a gasket 62 structure.

Figure 5:
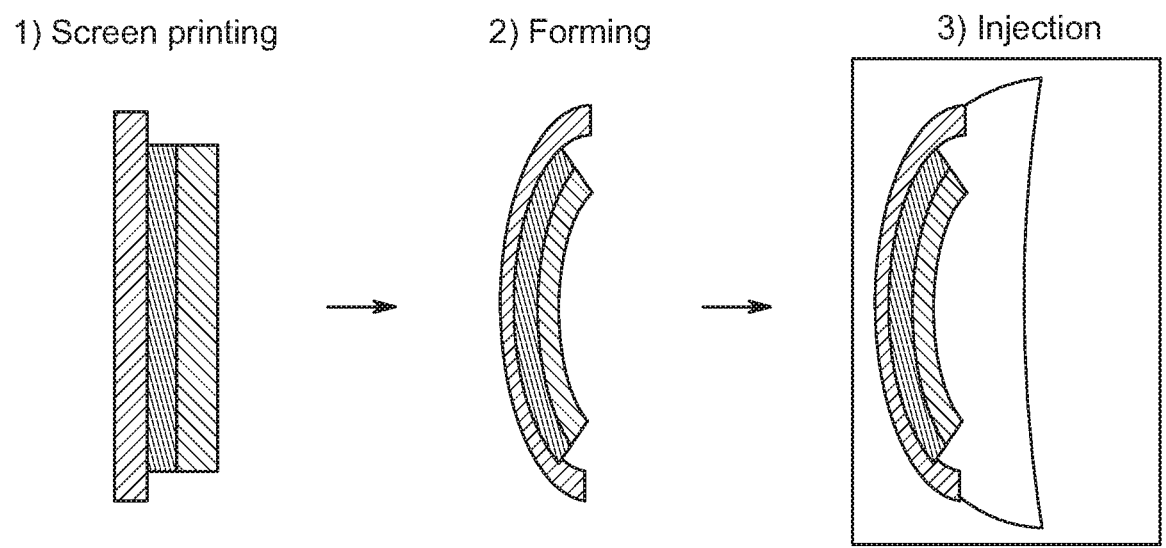
FIG. 5 is a schematic representation of the preparation of a lens-mask system.

FIG. 5 is a schematic representation of the preparation of a lens-mask system. The mask 61 is formed from an ink layer, a binder layer and a resin sheet. In a second step, the prepared product is formed into the desired shape of the lens. The formed layers are subsequently injection-molded with a clear resin to form the lens-mask system.

Figure 6:
FIG. 6 is a schematic representation of 2 K molded lens-mask system with tinted parts.

FIG. 6 is a schematic representation of 2K molded lens-mask system with tinted parts (grey parts) and translucent parts (white parts).

Figure 7:
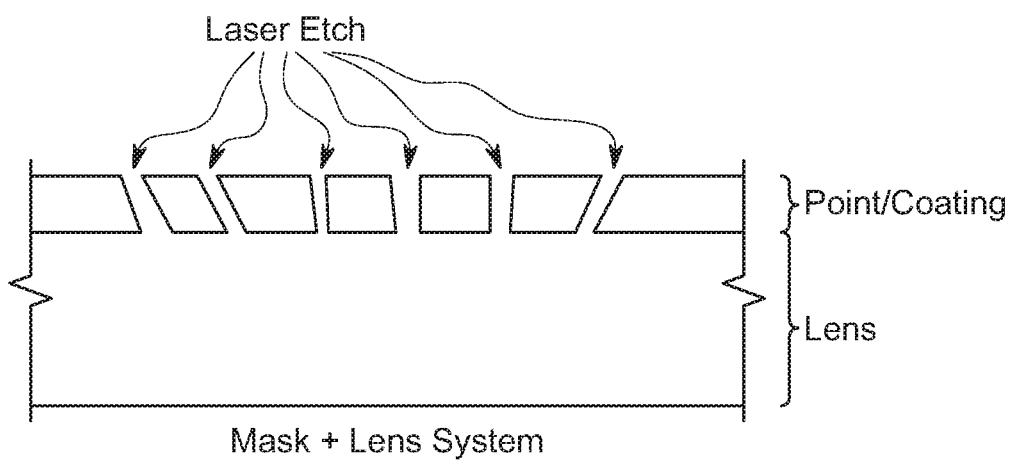
FIGS. 7 and 8 are embodiments for laser etching the mask with or without additional transmissive coating.
Figure 8:
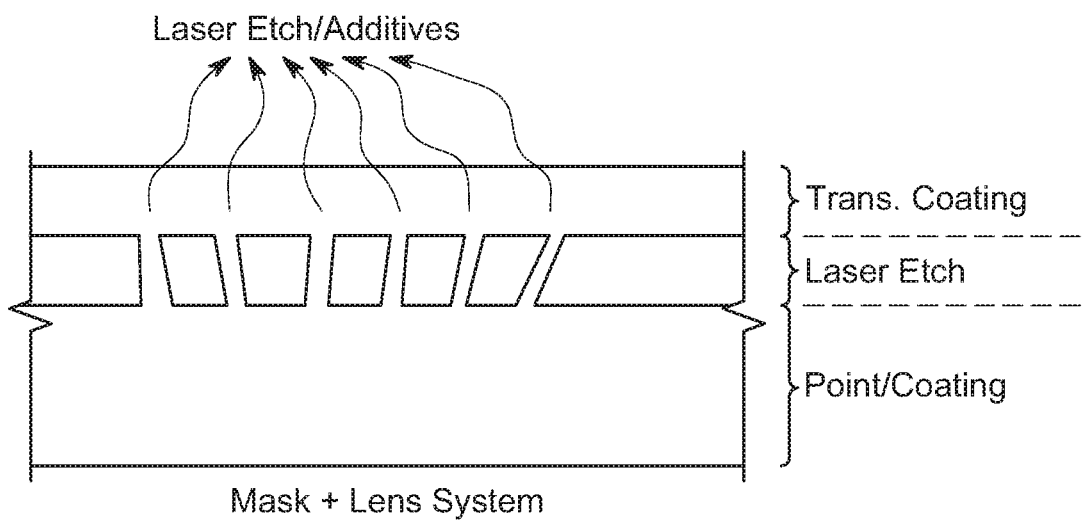

FIGS. 7 and 8 show schematic representations of embodiments in which the mask is laser etched. Here a paint or opaque coating is applied on the lens and the desired pattern is formed afterwards by the laser etching technique. A transmissive coating (FIG. 8) is applied on the etched parts in order to provide a smooth coating for the subsequent application of the transparent and/or translucent coating.

Figure 9:
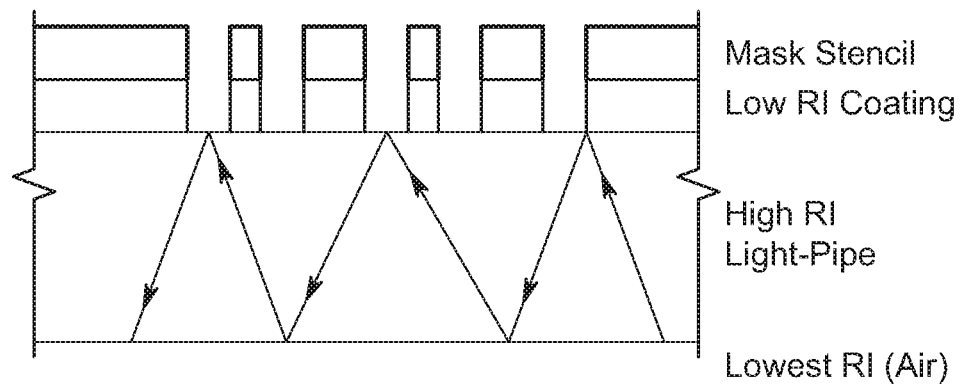
FIGS. 9 and 10 is a schematic view of the inventive HTL system having an additional coating with a low refractive index.
Figure 10:
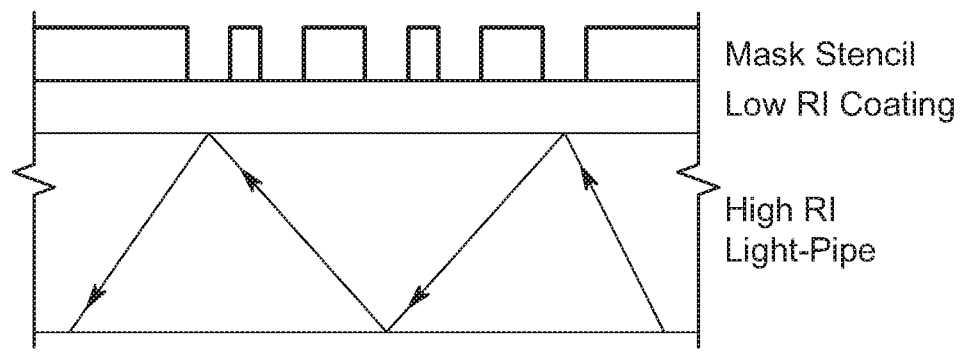

FIGS. 9 and 10 is a schematic view of the inventive system having an additional coating with a low refractive index. In FIG. 9, the additional coating has been laser etched similar to the mask, whereas in FIG. 10, the low refractive index coating is translucent and has not been etched.

Figure 11:
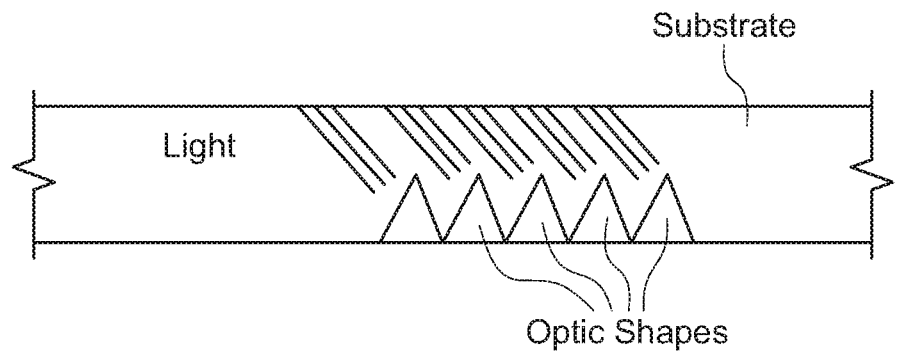
FIG. 11 is a schematic representation of an embodiment of the invention having optic shapes on the mask.

FIG. 11 is a schematic representation of an embodiment of the invention having optic shapes on the mask. The optic shapes refract light to different spectral colors thereby creating and illuminating colored pattern.

Figure 12:
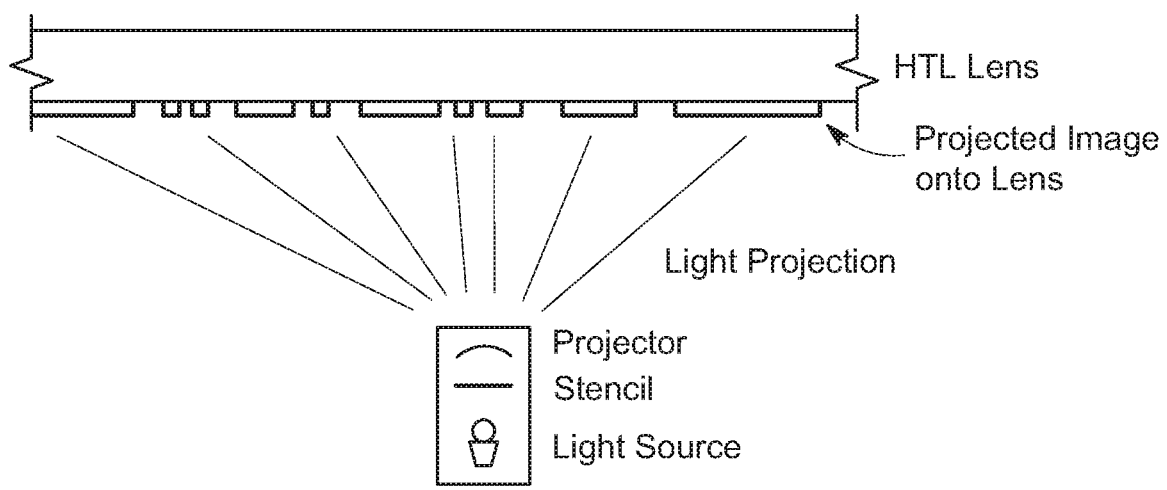
FIG. 12 is a schematic representation of an embodiment with an projector as the mask.

FIG. 12 is a schematic representation of an embodiment with an projector as the mask. In this embodiment the projector projects the desired image onto the inner side of the lens (60) so that it can be viewed from the outside of the lens.

Figure 13:
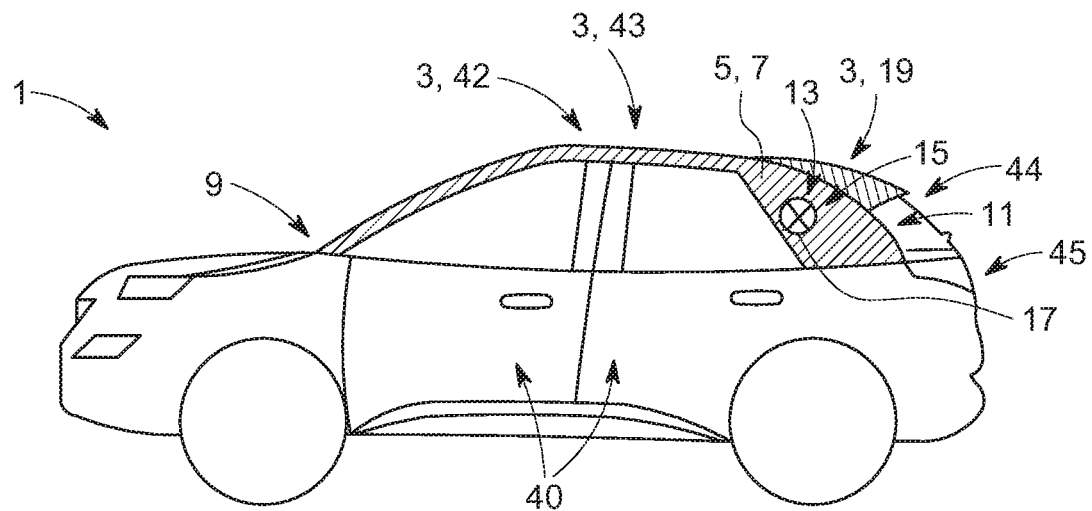
FIG. 13 is a schematic representation of a motor vehicle with an inventive covering device according to a first embodiment.

FIG. 13 shows a schematic representation of a motor vehicle 1 according to an example. This motor vehicle 1 includes the covering device 3.

The covering device 3, shown here as a one-piece covering device, includes a shaped element 5 which can be produced by a method of injection molding and simulates or represents the desired shape of the corresponding side part of the motor vehicle 1. The molded element 5 is covered with a cover 7 in the form of a chromium coating. In this case, it covers or is arranged on the entire outwardly pointing surface area of the element 5. In FIG. 1, the corresponding area is highlighted hatched. This clearly shows that the covering device 3 extends laterally and in the longitudinal direction of the motor vehicle 1 as a roof trim strip 42 above the door region 40, from a position 9 in the region of the A pillar of the motor vehicle 1 continuously to a position 11 in the region of the C. Likewise, the covering device 3 could cover a door region 40, preferably from one pillar part to the other pillar part of the same door area 40 or as a roof covering 43, at least a portion of the roof 41 of the motor vehicle 1, whereby the roof covering 43 extends from a position 9 in the region of an A-pillar of the motor vehicle 1 could extend continuously to at least one position 11 in the region of a C-pillar of the motor vehicle 1.

The covering device 3 has a light source 21 (not shown in FIG. 1) (see FIGS. 4-6) for emitting light, which is covered here in plain view from the outside by the molded element 5 or lens 7. A portion of the light emitted by the light source can pass through the molded element 5 and the lens 7 in at least a first region 13 of the cover device 3, which is located in the region of the C-pillar of the motor vehicle 1 to the outside. In the first region 13, the mold element 5 and the lens 7 has a passage opening 15. In the first area 13 and within the passage opening 15, a display means 17 part of the covering device 3 is arranged in the form of an emblem. The display means 17 is partially translucent configured and thus translucent from the back with light of the light source 21, which emerges visible in accordance with the translucent points to the outside.

The covering device 3 has a light source 21 (not shown in FIG. 13) (see FIGS. 16-18) for emitting light, which is covered here in plain view from the outside by the molded element 5 or lens 7. A portion of the light emitted by the light source can pass through the molded element 5 and the lens 7 in at least a first region 13 of the cover device 3, which is located in the region of the C-pillar of the motor vehicle 1 to the outside. In the first region 13, the mold element 5 and the lens 7 has a passage opening 15. In the first region 13 and within the passage opening 15, a display means 17 part of the covering device 3 is arranged in the form of an emblem. The display means 17 is partially translucent configured and thus translucent from the back with light of the light source 21, which emerges visible in accordance with the translucent points to the outside.

In a further embodiment not shown in FIG. 13, in a first region 13 of the covering device 3, the light from a light source 21 encompassed by the covering device 3 can be seen in a first region 13 of the covering device 3, which is present both in the molded element 5 and in the lens 7 is designed translucent, escape and thus cause a flat luminous impression.

Figure 14:
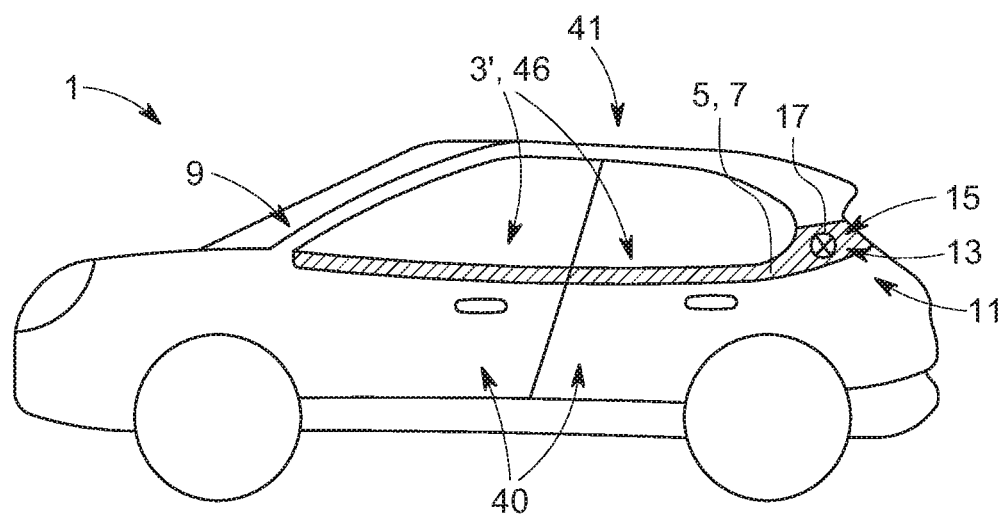
FIG. 14 is a schematic representation of a motor vehicle with an inventive covering device according to a further embodiment.

FIG. 14 shows a schematic representation of a motor vehicle 1 according to the invention according to the third aspect of the invention, a further embodiment. The elements and the mode of operation of the multi-part covering device 3' according to the invention largely correspond to the elements and functionalities shown in FIG. 13, with the individual parts of the multi-part covering device 3' being arranged on the two doors 40 as mutually movable regions of the motor vehicle 1. In order that both doors can be opened separately from one another, the part of the covering device 3' on the front door 40 is designed separately from the other part on the rear door 40. On the roof 41 no cover device is arranged. Of course, the embodiments of FIGS. 1 and 2 can be combined with each other.

As can be seen from FIG. 14, the embodiment of the covering device 3' differs from the covering device 3 of FIG. 13 in terms of its physical shape. Thus, the covering device 3' does not extend laterally above the windows of the motor vehicle 1 as a door shaft strip 46. The position of the display means 17 is different. This emphasizes the high freedom of design, which is made possible by the covering devices 3, 3' according to the invention.

Figure 15:
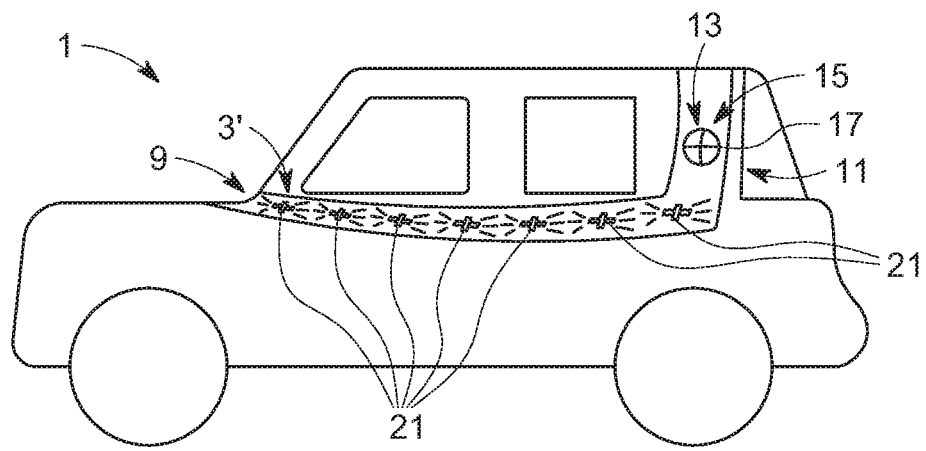
FIG. 15 is a schematic representation of a motor vehicle of an inventive covering device according to a further embodiment.

FIG. 15 shows a schematic representation of a motor vehicle 1 according to the invention in a further embodiment. This has a multi-part covering device 3' according to the invention, the elements and functions of which correspond to the embodiments of FIGS. 13 and 14 as far as possible.

For reasons of clarity, neither the shaped element 5 nor the lens 7 of the covering device 3' is shown in detail in FIG. 15. For this, the seven light sources 21 can be seen. Each of the light sources 21 is distributed to different positions behind the mold element 5 and the lens 7. The mold element 5 and the lens 7 are each translucent in this area. As a result, a planar lighting effect along the entire side surface of the motor vehicle 1 is achieved. For this purpose, furthermore, light guides (not explicitly shown in FIG. 15) covered by the covering device 3' are used. These also direct the light from the individual light sources 21 to other locations within the respective first region, whereby the illumination effect is more uniform. The light sources 21 preferably include light-emitting diodes. A further light source, which is not recognizable in FIG. 3, is arranged behind the display means 17.

Figure 16:
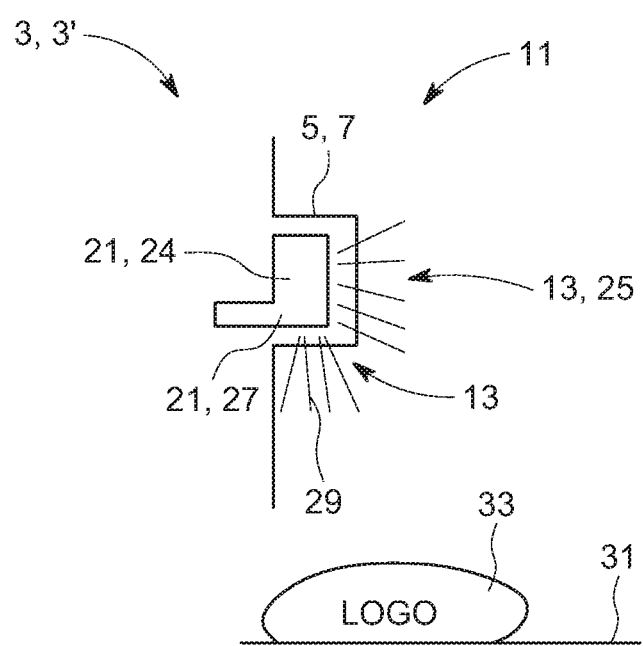
FIG. 16 is a schematic cross-section view of an inventive covering device in a further embodiment.

FIG. 16 shows a schematic cross-sectional illustration in a further embodiment of a covering device 3, 3' according to the invention.

The cross section is in the lateral section through the position 11 of the cover 3, 3' in the region of the C-pillar. As can further be seen from FIG. 16, the covering device 3, 3' has two light sources 21. Namely on the one hand a light emitting diode as a display device 24, the light passes in the emission direction 25 in a first translucent region 13 through the mold element 5 and the lens 7. On the other hand, a projection device 27, the light of which passes in the emission direction 29 in another first region 13 through a passage opening in the mold element 5 and in the lens 7 there through. In this case, a logo 33 is projected onto the ground 31 by the projection device 27 on a surface 31 of the floor below the covering device 3, 3'.

Figure 17:
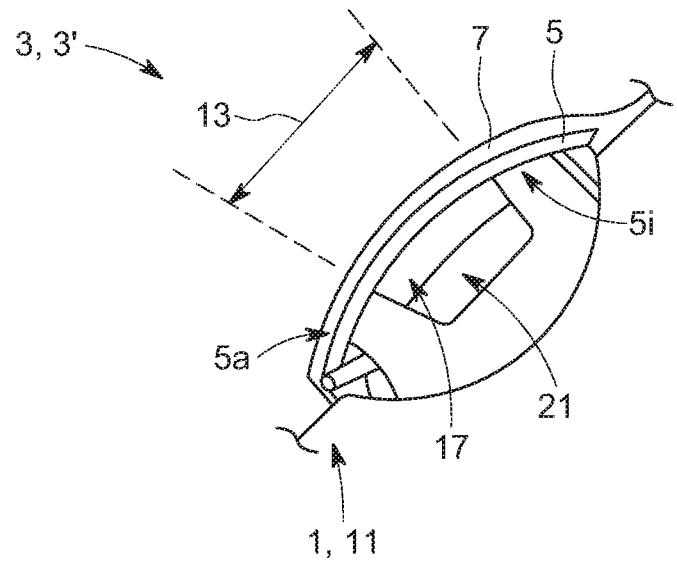
FIG. 17 is an embodiment of the inventive covering device in a side view.

FIG. 17 shows a schematic representation of an embodiment of the covering device 3,3' in the lateral section, from which the layers of the form element 5 and lens 7 emerge in a particularly clear manner. Here, the mold element 5 forms a cavity to the outside of the motor vehicle 1, in which the light source 21 is received. The lens 7 is arranged on the outside 5a of the element (5) in order to cover it to the outside. On the inside 5i of the formula element is a display means 17, preferably at least one emblem disposed. Here, the display means 17 is at least partially translucent, in particular transparent, configured and arranged in the first region 13, wherein at least part of the light emitted by the light source 21 passes through the mold element 5 and/or the lens 7 after can pass outside. The light source 21 is here connected via the display means 17 with the inner side 5i of the molded element 5 wherein the first region 13 covers the light source 21. In this embodiment, the light source 21 may be a planar arrangement of a plurality of LEDs or a planar OLED. The lens 7 includes at least one metal coating, which is preferably produced and/or producible by means of thin-film technology. The metal coating may include a chromium-containing layer, preferably the chromium-containing layer is a chromium alloy or a doped chromium layer. The lens 7 covers the display means 17 from.

Figure 18:
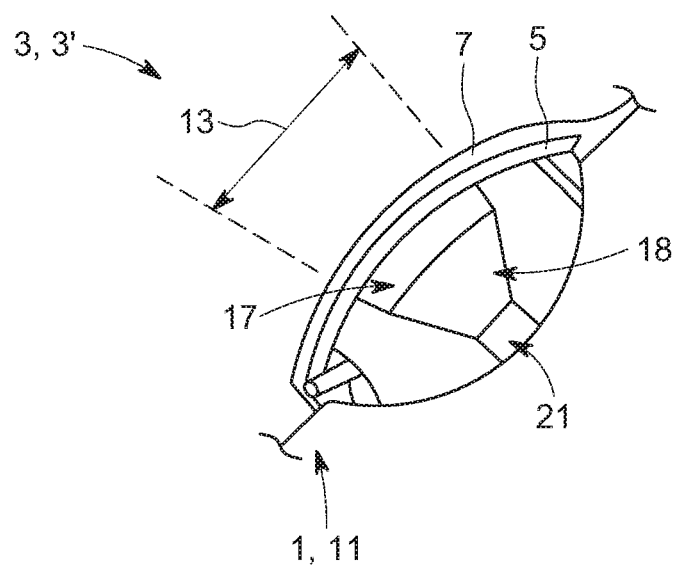
FIG. 18 is a further embodiment of the inventive covering device in a side view.

FIG. 18 shows a further embodiment of the covering device according to the invention in a lateral section. In contrast to FIG. 17, here the light source 21 is not arranged on the display means 17. Here, the cover device 3, 3' further includes a light guide 18 which distributes the light emitted by the light source 21 to the first area 13 by extending from the light source 21 to the display means 17. The light source 21 is embodied here as an LED or as a linear chain of LEDs. In other embodiments, the cover device 3, 3' could also include a plurality of optical fibers 18 and a plurality of first regions (13), wherein at least a first of the optical fibers 18 distributes light to at least one of the first regions 13 and at least a second of the optical fibers 18 emits light distributed at least one other first area 13. For the other components, reference is made to the description of FIG. 17.

It will be appreciated by those skilled in the art that changes could be made to the embodiments described above without departing from the broad inventive concept thereof. It is understood, therefore, that the invention disclosed herein is not limited to the particular embodiments disclosed, and is intended to cover modifications within the spirit and scope of the present invention.

REFERENCE SIGNS 1 car
3 (one-piece) cover device
3' (multi-part) cover device
5 Form element
5i the motor vehicle facing inside of the formula element
5a facing away from the motor vehicle outside of the formula element
7, 60 cover
9 position in the area of the A-pillar of the motor vehicle
11 position in the area of the C-pillar of the motor vehicle
13 first area
15 through opening
17 display means
18, 63 light pipe
19 spoiler
21, 64 light source
24 display device
25 light emission display device
27 projection device, light source
29 Light emission of the projection device or light source
31 area, for example, the ground
33 Information, for example a logo
40 door or door area of the motor vehicle
41 roof of the motor vehicle
42 covering device as a roof trim strip
43 cover device as a roof cover
44 rear window of the motor vehicle
45 vehicle rear of the motor vehicle
46 covering device as door shaft strip
50 HTL system
61 mask
62 gasket

What is claimed is:

1. A light emitting system, comprising:
at least one light pipe;
at least one light source disposed at least partially within an interior of the system;
at least one mask; and
a lens substantially enclosing the interior of the system, the at least one light pipe, and the at least one light source, the lens having an inner surface, an outer surface disposed opposite the inner surface and at least one of a continuous transparent or translucent coating on the outer surface,
wherein the at least one light source is configured to emit light by at least receiving electrical power from an electrical power source, the at least one light source being arranged adjacent to and directed towards the at least one light pipe,
with the at least one light source receiving electrical power from the electrical power source, the at least one of the continuous transparent or translucent coating is at least partially permeable to at least some light which is emitted by the at least one light source and passed through the lens, and
the mask and the lens are separable.

2. The system of claim 1, wherein the at least one light pipe or the lens comprises optic shapes that refract light to different colors, wherein the optic shapes are selected from at least one of micro lenses, prisms, or light refracting free form shapes.

3. The system of claim 1, further comprising at least one gasket between the at least one mask and the at least one light pipe, wherein the at least one gasket is configured to be permanently fixed to the at least one mask.

4. The system of claim 1, wherein the at least one of the transparent or translucent coating is a metal coating, wherein the metal coating is a chromium-based reflecting coating.

5. The system of claim 1, wherein the mask comprises an at least partially translucent image thereon, and the mask stretches along the entire lens.

6. The system of claim 1, wherein the mask is formed by molding an opaque material partly onto a clear material by a 2K molding process, and a window of clear material in at least one region of the mask is formed.

7. The system of claim 1, wherein the mask comprises faded marks, and the faded marks are optionally formed by etch, tint, pigments, additives or a combination thereof.

8. The system of claim 1, wherein at least one of
the lens or lens-mask system comprises an additional coating selected from at least one of a paint, an opaque material, a tint, or
wherein the lens or lens-mask system optionally comprising laser additives.

9. The system of claim 8, wherein the mask of the lens-mask system is formed by removal of parts of the additional coating, or by reacting the laser additives with a laser.

10. The system of claim 8, wherein the mask of the lens-mask system is formed by printing a negative on the opaque material.

11. The system of claim 1, wherein a transmissive coating is located between the lens-mask system and the at least one of the transparent or translucent coating.

12. The system of claim 1, wherein the at least one light pipe is formed from a material having a high refractive index, and the at least one light pipe comprises a coating with a material having a low refractive index.

13. The system of claim 1, wherein the at least one of the transparent or translucent coating comprises the same gaps or marks as given by the mask or the lens-mask system.

14. The system of claim 1, wherein the at least one light source comprises at least one of an incandescent light source, one or more light emitting diodes LED's, one or more organic light-emitting diodes, a combination thereof, or a similar display technology, wherein the at least one light source is located on a circuit board.

15. The system of claim 1, wherein the at least one light source is a logo lamp or projector which functions as the mask.

16. A vehicle design element comprising the light emitting system of claim 1.

17. A rear view device of a vehicle comprising the light emitting system of claim 1.

18. A covering device for arranging on at least one outer area of a motor vehicle, comprising
the light emitting system of claim 1; and
at least one molded element produced or producible by injection molding with an inner side facing the motor vehicle and an outer side pointing away from the motor vehicle;
wherein the lens at least partially covers the outer side of the molded element,
the light source is arranged on the inner side of the molded element or at least connected with the inner side, and the molded element covers the light source, and
at least a portion of the light emitted by the light source is configured to pass through the molded element and the lens outwardly in at least a first region of the covering device, wherein the molded element is translucent at least in the first region and the lens is translucent at least in the first region or has a passage opening.

19. The covering device of claim 18, wherein the light source is configured to display different colors as a multi-color light source.

20. The covering device of claim 18, wherein the translucency of the molded element or both of the molded element and the lens is adjustable by at least one of injection molding or different translucencies in an injection molding process being introduced.

21. The covering device of claim 18, further comprising at least one display means or at least one emblem.

22. The covering device of claim 21, wherein the display means is at least partially translucent or transparent, and is disposed at least partially in the first region.

23. The covering device of claim 21, wherein the lens at least partially covers the display means.

24. The covering device of claim 18, wherein the molded element forms at least one projection or cavity for receiving the light source.

25. The covering device of claim 18, wherein the light source comprises at least one projection device for projecting at least one of an information or a logo, on at least one of a surface, a lighting device, a floor lamp, or a puddle lamp, for illuminating at least one surface or at least one region of a ground.

26. The covering device of claim 18, wherein the light source (21, 24, 27, 64) is configured to at least one of
display different colors as a multicolor light source,
play or display several images, and
display user-related advertisements conveyed by key-specific information.

27. The covering device of claim 18, further comprising a plurality of light pipes and a plurality of first regions, wherein at least a first of the light pipes distributes light to at least one of the plurality of first regions and at least a second of the light pipes distributes light to at least another of the plurality of first regions.

28. A body component for a motor vehicle comprising the covering device of claim 18.

29. A motor vehicle the covering device of claim 18.

30. The motor vehicle of claim 29, wherein the covering device is arranged as a one-piece covering device or as a multi-part covering device comprising several separate parts on the motor vehicle, and individual parts are arranged on mutually movable areas of the motor vehicle.

31. The motor vehicle of claim 30, wherein the one-piece covering device covers a door region from one pillar part to another pillar part of the door region or above the door region as a roof trim strip or as a roof covering that covers at least a portion of the roof of the motor vehicle, and the roof cover or the roof trim strip extends from a position in a region of an A-pillar of the motor vehicle continuously to at least one position in a region of a C-pillar of the motor vehicle.

32. The motor vehicle of claim 30, wherein the one-piece covering device is arranged as a spoiler in a roof area, in a region of a rear window, or in a region of a vehicle rear, and the spoiler extends from one side of the motor vehicle to another side of the motor vehicle.

33. The motor vehicle of claim 30, wherein the one-piece covering device extends laterally on the motor vehicle over different door regions from a position in a region of the A-pillar to a position in an area of the C-pillar.

34. The motor vehicle of claim 33, wherein the multi-part covering device is arranged as a door shaft strip.

* * * * *